F. CORRADO & W. J. DOYLE.
TORPEDO GUARD.
APPLICATION FILED MAR. 15, 1916.

1,204,547.

Patented Nov. 14, 1916.
2 SHEETS—SHEET 1.

Inventors:
Frank Corrado
William J Doyle

F. CORRADO & W. J. DOYLE.
TORPEDO GUARD.
APPLICATION FILED MAR. 15, 1916.

1,204,547.

Patented Nov. 14, 1916.
2 SHEETS—SHEET 2.

Inventors:
Frank Corrado
William J. Doyle

UNITED STATES PATENT OFFICE.

FRANK CORRADO AND WILLIAM J. DOYLE, OF EVANSTON, ILLINOIS.

TORPEDO-GUARD.

1,204,547.

Specification of Letters Patent. Patented Nov. 14, 1916.

Application filed March 15, 1916. Serial No. 84,472.

*To all whom it may concern:*

Be it known that we, FRANK CORRADO and WILLIAM J. DOYLE, citizens of the United States, and residents of Evanston, county of Cook, and State of Illinois, have jointly invented certain new and useful Improvements in Torpedo-Guards, of which the following is a specification, and which are illustrated in the accompanying drawings, forming a part thereof.

The present invention relates to certain new and useful improvements in devices for protecting vessels at sea from injury resulting from contact with torpedoes.

Figure 1:
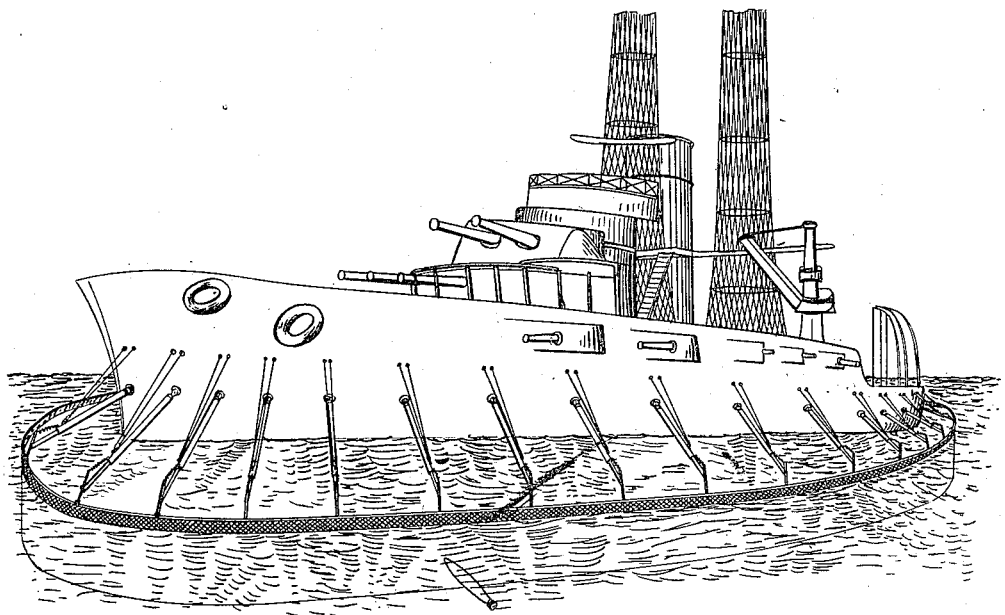
Figure 2:
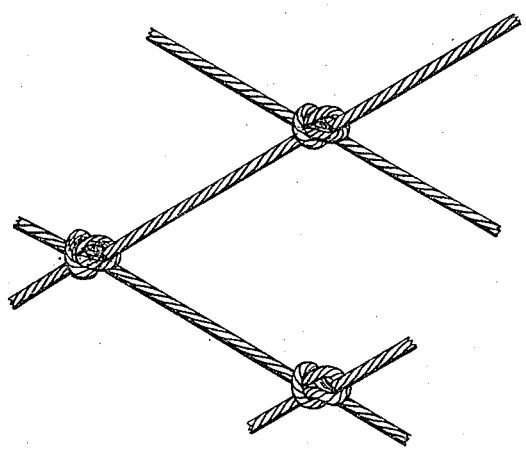
Figure 6:
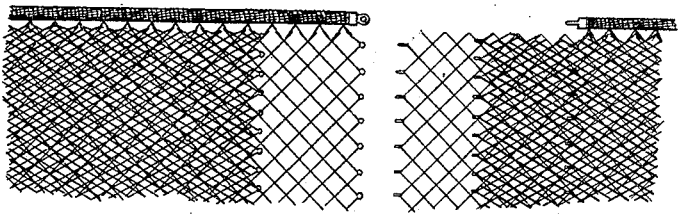
Figure 6:
Figure 5:
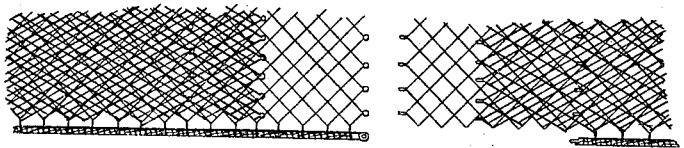
Figure 3:
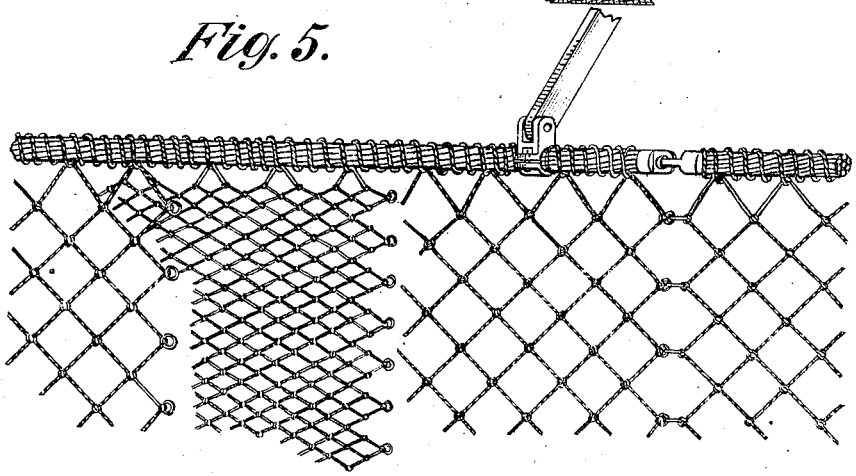
Figure 4:
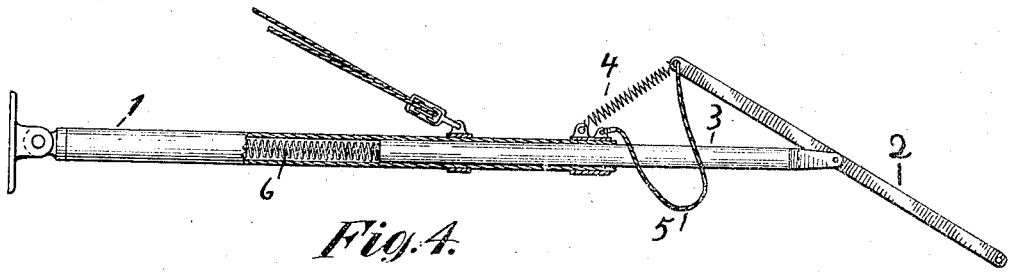

Figure 1 of the drawings shows how nets are hung on the shock absorbers. Fig. 2 shows how knots in the marine cable nets are tied. Figs. 3 and 5 show construction of nets, which are each fastened to a cable on top and bottom. Fig. 4 is shock absorber on which nets are hung. Fig. 6 shows snaps which are to be used on all connections on cables and nets and arm number 2 on Fig. 4.

The guard includes three nets placed one behind the other, the outer nets being of 14" mesh and the middle one of 9" mesh. These nets are made in sections as shown in Fig. 3, and are attached at the top and bottom to sectional flexible cables 7, all sections being connected by eyes and hooks shown in Fig. 6. The hook and eye connections of each net layer are offset about two feet from each other so that the connections will not be in alinement transversely of the guard as shown in Fig. 3. When one section is damaged it can be removed by release of the hook and eye connections, and another section can be inserted. A torpedo striking the net is prevented from glancing by contact with the middle and rear net.

The cables are hung from adjustable telescopic and sectional booms by means of the arms 2 pivoted to the end of the slidable section thereof and connected to the non-slidable section by springs 4 and cord 5, the former yielding when a torpedo strikes the net to permit the arms 2 to turn, the extent of the turning movement being limited by the cord 5. The booms are made of heavy tubes 1 receiving the sliding members 3, the movement of the latter being resisted by spring 6. Pressure on the net is transmitted to the spring 6 after the cord 5 is taut.

In operation, the arms 2 first permit the torpedo to press the guard rearwardly and downwardly, giving the nets a chance to interpose their own resistance, and after the cord 5 tightens the rod 3 is pressed back against the spring 6. When the arm 2 is pressed back as far as possible, the nets will have a tendency to rise upward, deflecting the nose of the torpedo upwardly.

Preferably the corresponding sections of the several net layers are of like length. By this means the offset position of the hook and eye connections for the several net layers is maintained at all of the joints. On the other hand, the normal depth of the intermediate net slightly exceeds that of the outer nets. The intermediate net accordingly hangs loosely between the top and bottom cables 7.

We claim as our invention,—

1. The combination with the hull of a vessel, a boom extending outwardly therefrom, an arm pivotally mounted upon the outer end of the boom, a net suspended from the free end of the arm and a spring resisting the pivotal movement of the arm.

2. The combination with the hull of a vessel, a boom extending outwardly therefrom, said boom comprising inner and outer slidingly connected members, means yieldingly resisting the inward sliding movement of the outer member of the boom on the said inner member, an arm pivotally mounted intermediate its ends on the outer end of the outer boom member to swing in a vertical plane, a net suspended from the lower end of the said arm, a spring extending between the other end of the arm and the inner boom member and means limiting the extension of the spring.

3. In a torpedo guard, in combination, flexible top and bottom cables and three layers of flexible net all connected to the said cables at top and bottom, the intermediate layer of net being of small mesh and of greater depth than the two outer layers of net to extend loosely between the cables when separated to the greatest distance permitted by the said outer layers.

4. In a torpedo guard in combination flexible top and bottom cables formed in sections, means detachably connecting the sections of each cable end to end, a plurality of layers of flexible net of different mesh all connected to the said cables at top and bottom, each layer of net being formed in sections of like length with the cable sections and means detachably connecting the sections of the corresponding layers of net end to end, the lines of connection of the sections of the several layers of net being longitudinally offset.

5. The combination with the hull of a vessel, of a horizontal series of independent longitudinally yielding supports extending outwardly therefrom adjacent the water line and a net suspended from the outer ends of the said supports.

FRANK CORRADO.
WILLIAM J. DOYLE.